US010758762B2

(12) United States Patent
Venhuizen

(10) Patent No.: US 10,758,762 B2
(45) Date of Patent: Sep. 1, 2020

(54) GYMNASTICS BALANCE BEAM COMPRISING A MULTILAYER COMPOSITE

(71) Applicant: JF OPERATIONS B.V., Helmond (NL)

(72) Inventor: Seerp Venhuizen, Someren (NL)

(73) Assignee: JFS BV, Helmond (NL)

( * ) Notice: Subject to any disclaimer, the term of this patent is extended or adjusted under 35 U.S.C. 154(b) by 118 days.

(21) Appl. No.: 16/158,382

(22) Filed: Oct. 12, 2018

(65) Prior Publication Data
US 2019/0126085 A1 May 2, 2019

(30) Foreign Application Priority Data
Oct. 27, 2017 (FR) ...................................... 17 60185

(51) Int. Cl.
*A63B 4/00* (2006.01)
*A63B 71/02* (2006.01)
(Continued)

(52) U.S. Cl.
CPC .............. *A63B 4/00* (2013.01); *A63B 71/023* (2013.01); *A63B 2071/0063* (2013.01);
(Continued)

(58) Field of Classification Search
CPC .. A63B 4/00; A63B 7/08; A63B 7/085; A63B 21/00047; A63B 21/00185; A63B 21/00189; A63B 21/02; A63B 21/028; A63B 21/05; A63B 21/068; A63B 21/4023; A63B 21/4027; A63B 22/0046; A63B 26/00; A63B 26/003; A63B 71/0054;
(Continued)

(56) References Cited

U.S. PATENT DOCUMENTS 1,377,891 A * 5/1921 Knight .................... E04C 3/122
52/841
3,582,068 A * 6/1971 Hallgren .................. A63B 4/00
482/34
(Continued)

FOREIGN PATENT DOCUMENTS

DE       25 15 253       10/1976
DE       29 18 934       11/1979
(Continued)

OTHER PUBLICATIONS

French Search Report, FR 1760185, filed on Jul. 12, 2018.

*Primary Examiner* — Gary D Urbiel Goldner
(74) *Attorney, Agent, or Firm* — Nixon & Vanderhye

(57) ABSTRACT

A gymnastics balance beam includes a rigid elongate member of specific cross-section covered with a covering, the elongate member of specific cross-section including a planar upper surface on which is provided an elastic multilayer composite including at least two layers, namely an upper layer, and a lower layer in contact with the planar surface of the elongate member of specific cross-section. The upper layer is a layer of rubbery material and the lower layer is a layer of an elastic material of stiffness less than the stiffness of the rubbery material of the upper layer. Such a balance beam limits the risks of injury by reducing impact forces, while maintaining bearing security for gymnasts.

17 Claims, 2 Drawing Sheets

Figure 1:
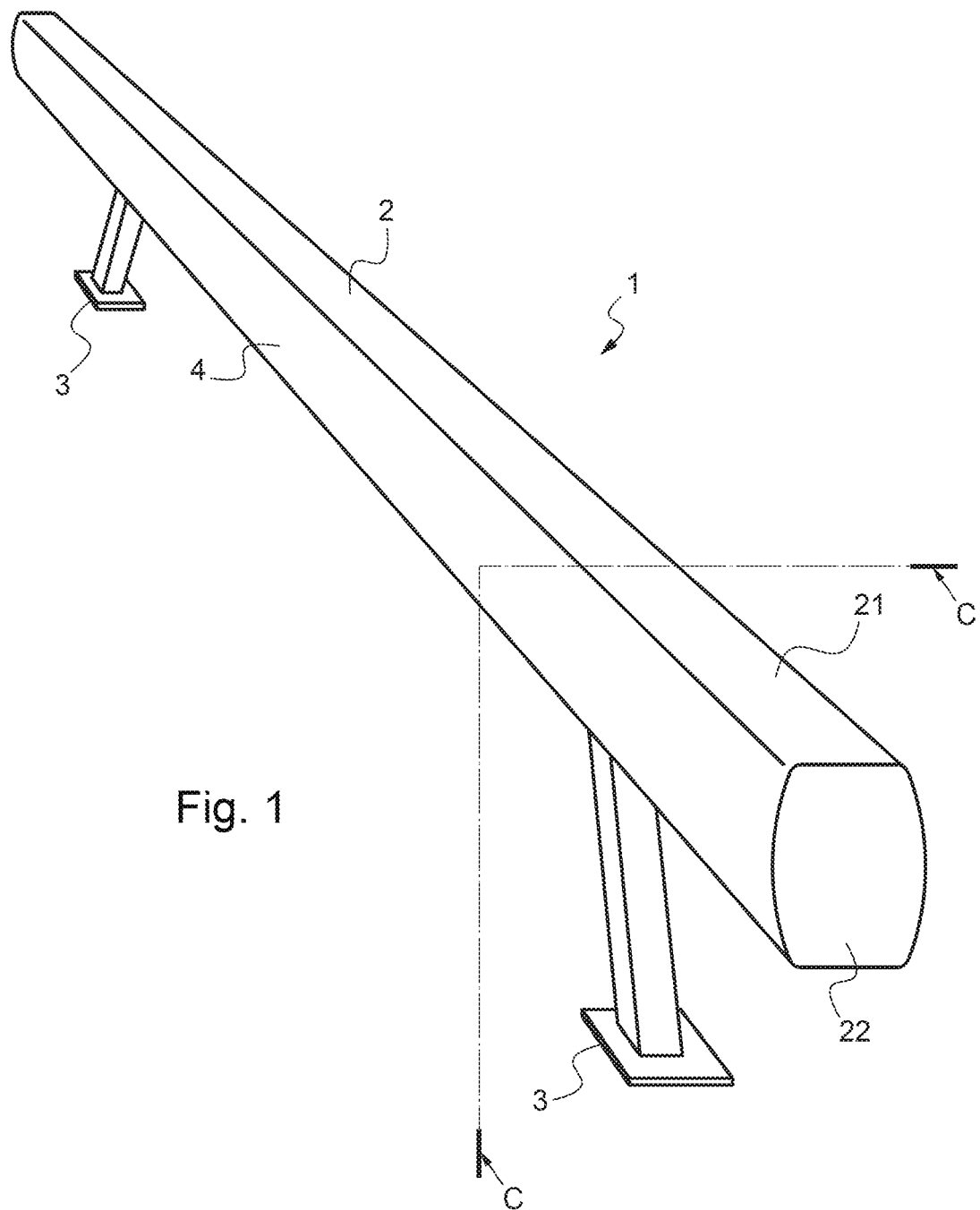

(51) Int. Cl.
*B32B 7/02* (2019.01)
*B32B 25/04* (2006.01)
*B32B 7/04* (2019.01)
*A63B 71/00* (2006.01)

(52) U.S. Cl.
CPC ............. *A63B 2209/02* (2013.01); *B32B 7/02* (2013.01); *B32B 7/04* (2013.01); *B32B 25/045* (2013.01); *B32B 2250/02* (2013.01); *B32B 2375/00* (2013.01)

(58) Field of Classification Search
CPC ..... A63B 71/02; A63B 71/023; A63B 71/028; A63B 71/04; A63B 2071/0063; A63B 2071/0072; A63B 2071/009; A63B 2071/024; A63B 2071/025; A63B 2071/026; A63B 2071/027; A63B 2208/0204; A63B 2208/0209; A63B 2208/028; A63B 2209/00; A63B 2209/02; A63B 2209/023; A63B 2209/026; A63B 2209/10; A63B 2209/14; A63B 2225/09; A63B 2225/093; A63B 2244/12
See application file for complete search history.

(56) References Cited

U.S. PATENT DOCUMENTS

| | | | | |
|---|---|---|---|---|
| 3,707,286 A | * | 12/1972 | Spieth | A63B 3/00 482/41 |
| 3,990,697 A | * | 11/1976 | Reuther | A63B 4/00 482/34 |
| 4,272,073 A | * | 6/1981 | Grosser | A63B 4/00 482/34 |
| 5,133,699 A | * | 7/1992 | Cooper | A63B 4/00 482/34 |
| 5,183,438 A | * | 2/1993 | Blom | B32B 5/18 472/92 |
| RE37,468 E | * | 12/2001 | Kennedy | A63B 41/08 473/596 |
| 6,383,118 B1 | * | 5/2002 | Nestoiter | A63B 4/00 482/23 |
| 2002/0177508 A1 | * | 11/2002 | Eyman, Jr. | A63B 4/00 482/23 |
| 2006/0276305 A1 | * | 12/2006 | Schank | A63B 4/00 482/25 |
| 2008/0176715 A1 | * | 7/2008 | Dick | A63B 4/00 482/34 |
| 2009/0093343 A1 | * | 4/2009 | Gallus | A63B 4/00 482/34 |
| 2009/0162651 A1 | * | 6/2009 | Rios | B32B 3/30 428/354 |
| 2014/0259399 A1 | * | 9/2014 | Tsai | A63B 21/4037 5/420 |
| 2017/0043199 A1 | * | 2/2017 | Lin | A63B 4/00 |
| 2018/0117389 A1 | * | 5/2018 | Kao | A63B 23/04 |
| 2019/0022464 A1 | * | 1/2019 | Brieu | A63B 4/00 |

FOREIGN PATENT DOCUMENTS

| | | |
|---|---|---|
| DE | 20 2005 014583 | 11/2005 |
| FR | 1 549 312 | 12/1968 |
| FR | 2 655 552 | 6/1991 |

\* cited by examiner

GYMNASTICS BALANCE BEAM COMPRISING A MULTILAYER COMPOSITE

The present invention concerns the technical field of artistic gymnastics equipment, also called apparatuses, and more particularly the field of balance beams.

A balance beam is an apparatus used in feminine artistic gymnastics. It is an elongate rectangular beam raised relative to the ground by a leg or support at each of its ends.

A balance beam is commonly produced by an elongate member of specific cross-section of aluminum or of any other equivalent material having similar mechanical properties and good durability, covered with a covering for example of PVC (polyvinyl chloride), leather or artificial leather.

The geometry and dimensions of a balance beam are set by standards, for example the norms of the International Federation of Gymnastics which are referred to as "FIG" norms. For example, a balance beam must have a length of five meters and a width of ten centimeters on its upper surface on which the gymnasts perform. The standards also require characteristics regarding the rigidity of the balance beam, in particular its resistance to bending under load.

The FIG norms provide that the upper surface must have properties enabling shocks to be absorbed and to protect the joints of the gymnasts' limbs. It must furthermore be elastic to support jumps. Antinomically, the FIG norms provide that bearing safety must be ensured by the balance beam. For this, the elasticity must be distributed in a balanced way in order not to give rise to bearing instability.

In other words, balance beams must meet criteria in terms of impact force, deflection or sinking-in of the surface on impact, and in terms of rebound.

The impact force must be limited to protect the gymnasts' joints. Sinking-in must be limited and above all the behavior of the balance beam with regard to sinking-in must be the same over the whole of the upper surface of the balance beam to ensure good stability. Rebound, which is expressed as the energy returned, must be within a certain range so as to enable the reception of the gymnasts while enabling the execution of a sequence of figures requiring a certain rebound.

In this context, the balance beams generally employed, although meeting the standards in force, may be rather trauma-inducing for gymnasts' joints.

An improved gymnastic balance beam is available commercially. Thus balance beam comprises, at its upper surface, a multilayer composite comprising two layers of Ethylene Vinyl Acetate foam or "EVA" foam, separated by a rigid intermediate plate. This balance beam presents an improved solution relative to the conventional balance beams as regards the reduction in the impact force, but it has proved to give poor satisfaction as regards stability.

Document FR2655552 discloses a balance beam constituted in similar manner, wherein a rigid plate for example of wood is interposed between two flexible lays.

The present invention is directed to providing a gymnastics balance beam that is optimized with regard to limitation of the impact force and thus the protection of gymnasts' joints, while providing good stability and satisfactory rebound.

The invention thus relates to a gymnastics balance beam comprising a rigid elongate member of specific cross-section covered with a cover, the elongate member of specific cross-section comprising a planar upper surface on which is provided an elastic multilayer composite constituted by two layers, namely an upper layer and a lower layer in contact with the planar surface of the elongate member of specific cross-section. The upper layer is a layer of rubbery material and the lower layer is a layer of an elastic material of stiffness less than the stiffness of said rubbery material of the upper layer.

The upper layer of rubbery material is chosen and dimensioned so as to be sufficiently rigid to distribute the impact force within the lower layer, and thereby ensure a uniform behavior of the surface of the balance. This gives good bearing security or stability, which is perceived by the gymnast and enables her to be confident when executing her exercise on the balance beam. This stability is expressed by the measurement of equal or substantially equal sinking-in for identical application of force, over the entire upper surface of the balance beam. The upper layer is nevertheless sufficiently elastic not to be trauma-inducing, and to give sufficient rebound. The lower layer is chosen and dimensioned to absorb the impact energy as much as possible, without penalizing the bearing security.

The upper layer may be bonded to the lower layer.

The upper layer may comprise rubber fibers or beads and a binder.

The binder may for example be of polyurethane type or polyurethane-based.

The upper layer may have a stress-strain characteristic in compression comprised between 0.20 and 0.40 N/mm$^2$ at 25% compression, for example of the order of 0.30 N/mm$^2$.

The lower layer may be of polyurethane foam.

The lower layer may in particular have a mass per unit volume comprised between 250 and 450 kg per cubic meter, for example 350 kg per cubic meter.

The multilayer composite may be bonded to the planar upper surface of the elongate member of specific cross-section.

The upper layer may for example have a thickness comprised between 3 mm and 20 mm, for example 12 mm.

The lower layer may for example have a thickness comprised between 10 mm and 30 mm, for example 20 mm.

Still other particularities and advantages of the invention will appear in the following description.

Figure 2:
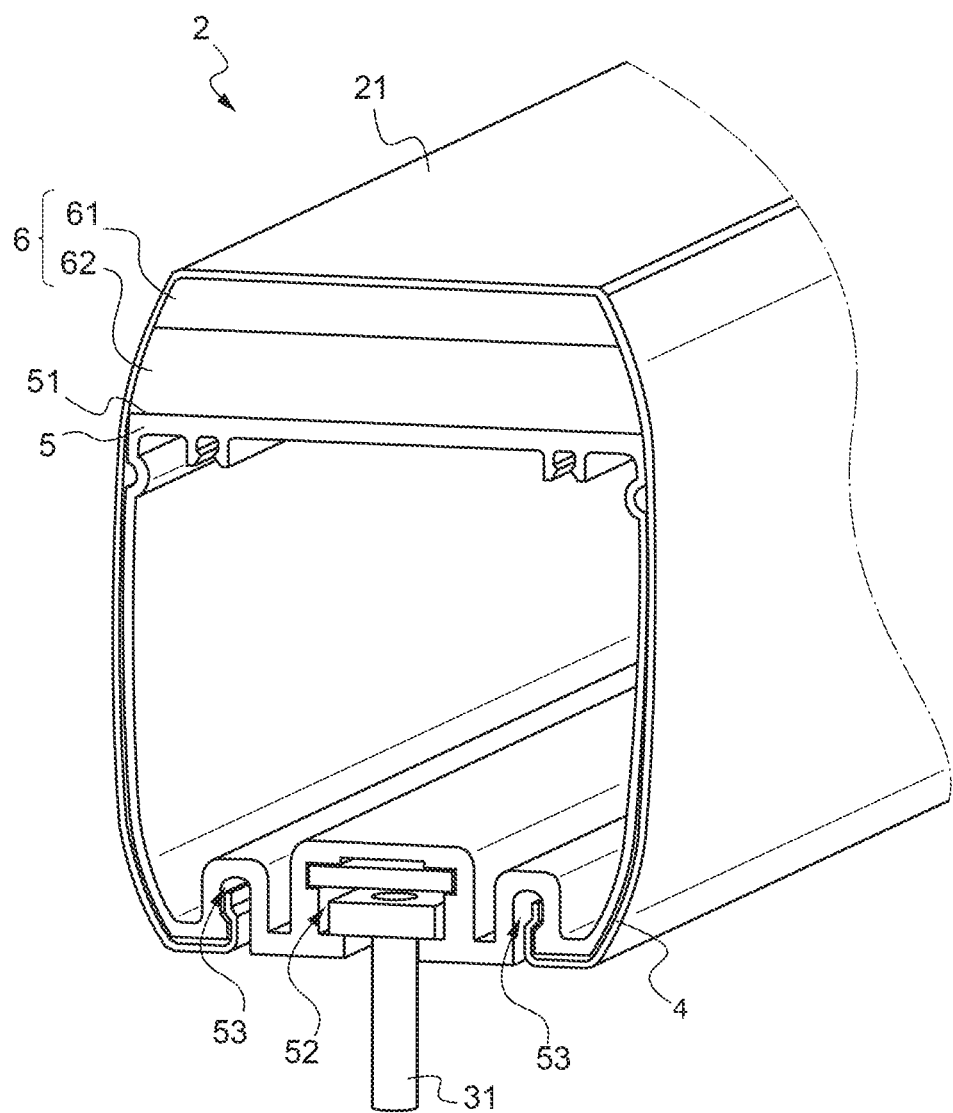

In the accompanying drawings, given by way of non-limiting example:

FIG. 1 presents a gymnastics balance beam in a three-dimensional diagrammatic view;

FIG. 2 presents a gymnastics balance beam in accordance with an embodiment of the invention, in a cross-section view.

FIG. 1 presents a gymnastics balance beam 1. A gymnastics balance beam 1 is an apparatus comprising an actual beam 2, that is to say an elongate horizontal support, which comprises an upper surface 21 on which a gymnast may perform. The beam 2 has a length of five meters, and its upper surface 21 has a width of ten centimeters. The beam 2 has a profile having a maximum width of thirteen centimeters. The beam 2 is supported by two legs forming beam supports 3. These beam supports 3 maintain the beam 2 in a stable position even when it is used by a gymnast. They may enable adjustment in height or even be elastically adjustable by providing the gymnasts several positions of rigidity.

The beam 2 may be produced from any appropriate material such as wood or aluminum. The beam 2 is finished by a beam end piece 22 which is advantageously flexible.

The beam 2 is covered with a covering (distinct from the multilayer composite described below), taking for example the form of a sleeve. Without being slippery, the covering of the upper surface of the beam must enable effort-free movements and rotations. In particular, the material of the covering must not cause skin burns. Thus, the covering employed may be constituted by, or have, an outside layer of leather, artificial leather, PVC, suedette or any other appropriate natural or synthetic material.

The covering 4 is generally bonded, stapled and/or attached by any other means to the beam. This avoids any slipping of the covering 4 on the beam 2 during the performance of a gymnast on the beam.

The general appearance of a balance beam in accordance with the invention is identical or very similar to that of a balance beam in accordance with the state of the art. FIG. 1 thus corresponds to the representation both of a balance beam in accordance with the state of the art and a balance beam in accordance with the invention.

FIG. 2 presents a balance beam in accordance with an embodiment of the invention in a cross-section view on the section plane C-C represented in FIG. 1.

The beam 2 comprises an elongate member 5 of specific cross-section. In the example presented here, the elongate member of specific cross-section 5 is metallic, for example of aluminum or of aluminum alloy. The elongate member 5 of specific cross-section extends longitudinally over the whole length of the beam 2 of which it defines the general shape. The elongate member of specific cross-section 5 is rigid, and in particular has a high bending resistance. The elongate member 5 of specific cross-section provides the general rigidity of the apparatus. The elongate member 5 of specific cross-section has a complex shape in cross-section. In the bottom portion, it may be shaped to enable the fastening of the beam supports 3. In the example presented here, the elongate member of specific cross-section forms a slide-track 52. A fastening pin 31 may be inserted within the slide-track 52 and secured if necessary to provide the fastening or the adjustment of a beam support 3. According to the type of beam support, it may typically comprise one or two links with the elongate member 5 of specific cross-section, for example via fastening pins 31 as in the example represented here. The pin 31 may for example be linked to a strut linking the balance beam 3 to an inclined main limb of a beam support, in order to adjust the height of the beam 2 relative to the ground.

On its bottom portion, the elongate member 5 of specific cross-section further comprises two channels 53 enabling the reliable fastening and if appropriate the proper tensioning of the covering 4 on the beam 2.

The elongate member 5 of specific cross-section comprises a planar surface 51 on its top portion. In the context of the invention, the planar surface 51 is configured to receive a multilayer composite 6.

The height of the elongate member 5 of specific cross-section depends on the thickness of the multilayer composite 6, and vice-versa. As a matter of fact, in order to comply with the standards in force, in particular the FIG norms, a gymnastics balance beam must have a height, along a vertical axis, of 16 cm. Thus, the height of the elongate member 5 of specific cross-section, between a bottom point and the planar surface 51 to which is added the thickness of the multilayer composite 6, must be such that the final height of the beam 2 is 16 cm. The thickness of the covering 4 may be taken into account but can generally be ignored on account of a tolerance of 0.5 cm for the height of the beam 2 according to the FIG standard.

For example, for a multilayer composite 6 having a total thickness of 32 mm, the height of the elongate member 5 of specific cross-section will be of the order of 128 mm. The thickness of the multilayer composite to determine the height of the elongate member 5 of specific cross-section is understood as the thickness after installation on the beam. As the composite 6 is flexible, it may be slightly squashed by the tension of the covering 4. Similarly, if the thickness of the covering 4 is taken into account, the height of the elongate member 5 of specific cross-section will be reduced by twice the thickness of the covering 4, since there is a layer of covering on the upper surface 21 of the beam 2, and a layer under the beam 2.

As regards the width of the beam 2, its maximum width must be 13 cm while the width of its upper surface is 10 cm. To simplify the implementation of the invention, it is possible, as in the embodiment illustrated in FIG. 2, for the elongate member 5 of specific cross-section to have an upper surface 51 corresponding to the maximum width of the beam, that is to say 13 cm according to the FIG norms, reduced if appropriate by twice the thickness of the covering 4. The width restriction leading to the width of 10 cm for the upper surface of the beam 2 is obtained by a composite 6 of substantially trapezoidal shape, of which the non-parallel sides may have a slightly convex shape.

The multilayer composite comprises two layers, namely, an upper layer 61 and a lower layer 62.

The lower layer 62 is a relatively flexible layer of foam. It provides a major part of the energy absorption function. The lower layer may be formed from polyurethane foam, or foam based on polyurethane. The foam employed may have a density comprised between 150 kg/m$^3$ and 650 kg/m$^3$, for example between 250 kg/m$^3$ et 450 kg/m$^3$, for example 350 kg/m$^3$.

The foam employed for the lower layer 62 may alternatively be a polyethylene foam.

The upper layer 61 is a layer that is flexible and elastic, but nevertheless of greater stiffness than that of the lower layer 62. The upper layer 61 is sufficiently rigid to distribute the energy of an impact over a large surface area of the lower layer 61, which provides a major part of the energy absorption function. For example, the upper layer 62 may have a stress-strain characteristic in compression comprised between 0.20 and 0.40 N/mm$^2$, for example of the order of 0.30 N/mm$^2$.

In order to present the desired characteristics of stiffness and energy return, the upper layer 61 is formed by a rubbery material. In particular, the upper layer 61 comprises particles of rubber in the form of beads and/or fibers. The particles of rubber are bound by a binder. The binder may be polyurethane or polyurethane-based. Any other flexible binder adapted to the binding of the rubber particles may be employed for the formation of the material constituting the upper layer 61.

The respective thickness of the upper layer 61 and of the lower layer 62 of course depends on the properties of the materials which constitute said layers. With the aforementioned materials, the upper layer 61 may have a thickness comprised between 3 mm and 20 mm, for example 12 mm. The lower layer may have a thickness comprised between 10 mm and 30 mm, for example 20 mm.

The upper layer 61 and the lower layer 62 are advantageously bonded to each other. The adhesive employed must be compatible with the materials employed to form each layer of the multilayer composite. The adhesive must furthermore be sufficiently flexible. It must modify as little as possible the mechanical properties of each layer, and influence as little as possible the behavior of the multilayer composite. The adhesive employed may for example be of polyurethane, neoprene or silicone type.

The composite 6 may advantageously be itself bonded to the planar surface 51 of the elongate member 5 of specific cross-section. The adhesive employed for this may be of any type compatible with the material constituting the lower layer 62 and with the elongate member 5 of specific cross-section.

In an embodiment of the invention comprising:
an upper layer of 12 mm thickness constituted by rubber beads with a polyurethane binder having a density of 374 kg/m$^3$ and a stress-strain characteristic in compression of 0.30 N/mm$^2$ at 25% compression measured in accordance with the standard DIN EN ISO 3386-2; and
a lower layer constituted by polyurethane foam with a density of 350 kg/m$^3$,
the following results have been measured, respectively at a median point B of the beam, that is to say in the middle of the upper surface 21, and at a point A located 1 cm from the edge of the upper surface 21:
Impact force: 4834N at point A; 4721N at point B;
Sinking-in: 17 mm at point A, 17 mm at point B;
Rebound: 63 mm at point A, 63 mm at point B;
These measurements may be compared to measurements carried out on a conventional balance beam, such as is known in the state of the art.
Impact force: 2002N at point A; 2004N at point B;
Sinking-in: 10.5 mm at point A, 10.6 mm at point B;
Rebound: 25 mm at point A, 21 mm at point B;
In this embodiment, the invention thus enables a high reduction, of more than 60%, of the impact force, while maintaining perfect stability (instability being expressed by the difference in sinking-in between point A and point B). Although the rebound is increased, it remains within acceptable limits, both from a regulatory point of view and from that of the sensations of the gymnast.

Naturally, the multilayer composite may comprise more than two layers, without departing from the scope of the invention.

An intermediate film, for example of PVC, may be interposed between the upper layer 61 and the lower layer 62.

A balance beam in accordance with the invention thus comprises a multilayer composite 6 enabling a limitation of the impact forces by absorption of the energy on impact, for example on reception of a gymnast on the beam. This strongly limits the risk of injuries, whether it be further to repeated receptions on the balance beam or in case of improper reception or accident. The security of support, or stability, is however maintained. The gymnast performing on a balance beam in accordance with the invention is thus in security and confident.

The invention claimed is:

1. A gymnastics balance beam comprising a rigid elongate member (5) of specific cross-section covered with a cover (4), the rigid elongate member (5) of specific cross-section comprising a planar upper surface (51) on which is provided an elastic multilayer composite (6),
wherein the elastic multilayer composite (6) comprises:
an upper layer (61); and
a lower layer (62) in contact with the planar upper surface (51) of the rigid elongate member (5) of specific cross-section;
wherein the upper layer (61) is a layer of rubbery material and the lower layer (62) is a layer of an elastic material of a stiffness less than a stiffness of said rubbery material of the upper layer (62), and
wherein the upper layer (61) comprises a binder and either rubber fibers or rubber beads.

2. The gymnastics balance beam according to claim 1, wherein the upper layer (61) is bonded to the lower layer (62).

3. The gymnastics balance beam according to claim 2, wherein the upper layer (61) has a stress-strain characteristic in compression comprised between 0.20 and 0.40 N/mm$^2$ at 25% compression.

4. The gymnastics balance beam according to claim 2, wherein the lower layer (62) comprises polyurethane foam.

5. The gymnastics balance beam according to claim 2, wherein the lower layer (62) has a mass per unit volume comprised between 250 and 450 kg per cubic meter.

6. The gymnastics balance beam according to claim 1, wherein the binder comprises polyurethane.

7. The gymnastics balance beam according to claim 6, wherein the upper layer (61) has a stress-strain characteristic in compression comprised between 0.20 and 0.40 N/mm$^2$ at 25% compression.

8. The gymnastics balance beam according to claim 6, wherein the lower layer (62) comprises polyurethane foam.

9. The gymnastics balance beam according to claim 1, wherein the upper layer (61) has a stress-strain characteristic in compression being 0.30 N/mm$^2$ at 25% compression.

10. The gymnastics balance beam according to claim 1, wherein the lower layer (62) has a mass per unit volume of 350 kg per cubic meter.

11. The gymnastics balance beam according to claim 1, wherein the upper layer (61) has a stress-strain characteristic in compression comprised between 0.20 and 0.40 N/mm$^2$ at 25% compression.

12. The gymnastics balance beam according to claim 11, wherein the lower layer (62) comprises polyurethane foam.

13. The gymnastics balance beam according to claim 1, wherein the lower layer (62) comprises polyurethane foam.

14. The gymnastics balance beam according to claim 1, wherein the lower layer (62) has a mass per unit volume comprised between 250 and 450 kg per cubic meter.

15. The gymnastics balance beam according to claim 1, wherein the elastic multilayer composite (6) is bonded to the planar upper surface (51) of the rigid elongate member (5) of specific cross-section.

16. The gymnastics balance beam according to claim 1, wherein the upper layer (61) has a thickness comprised between 3 mm and 20 mm.

17. The gymnastics balance beam according to claim 1, wherein the lower layer (62) has a thickness comprised between 10 mm and 30 mm.

\* \* \* \* \*